United States Patent
Kim et al.

(10) Patent No.: US 11,021,185 B2
(45) Date of Patent: Jun. 1, 2021

(54) REAR-WHEEL STEERING SYSTEM AND CONTROLLING METHOD THEREOF

(71) Applicant: MANDO CORPORATION, Pyeongtaek-si (KR)

(72) Inventors: Dae Sung Kim, Suwon-si (KR); Jin Hwan Lee, Seongnam-si (KR); SeungCheol Lee, Osan-si (KR)

(73) Assignee: MANDO CORPORATION, Pyeongtaek-si (KR)

( * ) Notice: Subject to any disclaimer, the term of this patent is extended or adjusted under 35 U.S.C. 154(b) by 157 days.

(21) Appl. No.: 16/128,389

(22) Filed: Sep. 11, 2018

(65) Prior Publication Data

US 2019/0077444 A1    Mar. 14, 2019

(30) Foreign Application Priority Data

Sep. 11, 2017   (KR) .......................... 10-2017-0115897

(51) Int. Cl.
 *B62D 5/04*    (2006.01)
 *B62D 15/02*    (2006.01)
 (Continued)

(52) U.S. Cl.
 CPC ............ *B62D 5/049* (2013.01); *B62D 5/0421* (2013.01); *B62D 5/0466* (2013.01); *B62D 7/148* (2013.01);
 (Continued)

(58) Field of Classification Search
 CPC ..................................................... B62D 5/049
 (Continued)

(56) References Cited

U.S. PATENT DOCUMENTS 4,953,652 A  *  9/1990  Ohmura ................. B62D 7/148
                                                         180/404
5,014,801 A  *  5/1991  Hirose .................... B62D 7/148
                                                         180/412
(Continued)

FOREIGN PATENT DOCUMENTS

DE     69824781-D1    *  8/2004   ............... B62D 6/00
EP       0328002 A2   *  8/1989   ............. B62D 7/148
(Continued)

OTHER PUBLICATIONS

Google Translation of DE-69824781-D1 (Apr. 3, 2020).*
(Continued)

*Primary Examiner* — Jean Paul Cass
(74) *Attorney, Agent, or Firm* — Morgan, Lewis & Bockius LLP

(57) ABSTRACT

The present disclosure relates to a rear-wheel steering system and a controlling method thereof. The rear-wheel steering system includes: a rack configured to transmit a driving force generated from a rear-wheel steering motor to rear wheels; a first correction module configured to, when an engine is started, detect a position of the rack using a displacement sensor and calculate a first correction value that is a difference between the detected position and a neutral position; a second correction module configured to, when the engine is started, detect a position of the rack using a motor position sensor that detects a rotation angle of the rear-wheel steering motor and calculate a second correction value that is a difference between the detected position and the neutral position; a comparison determiner configured to compare the first correction value and the second correction value to determine whether the displacement sensor has malfunctioned; and a steering controller configured to control an operation of the rear-wheel steering motor. Accordingly, it is possible to determine whether an error occurs in
(Continued)

the displacement sensor and to return the rack to the neutral position even when the error has occurred in the displacement sensor.

11 Claims, 7 Drawing Sheets

(51) Int. Cl.
  *B62D 7/15* (2006.01)
  *B62D 7/14* (2006.01)
(52) U.S. Cl.
  CPC ....... *B62D 7/1581* (2013.01); *B62D 15/0225* (2013.01); *B62D 15/0235* (2013.01); *B60Y 2400/84* (2013.01)
(58) Field of Classification Search
  USPC .......................................................... 701/41
  See application file for complete search history.

(56) References Cited

U.S. PATENT DOCUMENTS

| | | | | |
|---|---|---|---|---|
| 5,048,852 A * | 9/1991 | Chikuma | ............. | B62D 7/1536 |
| | | | | 180/414 |
| 5,083,628 A * | 1/1992 | Kanazawa | ............. | B62D 7/159 |
| | | | | 180/415 |
| 5,101,922 A * | 4/1992 | Ohmura | ................. | B62D 7/148 |
| | | | | 180/404 |
| 5,168,948 A * | 12/1992 | Rohringer | ............. | B62D 7/148 |
| | | | | 180/414 |
| 5,181,173 A * | 1/1993 | Avitan | ................. | B62D 5/0418 |
| | | | | 180/446 |
| 5,293,953 A * | 3/1994 | Edahiro | ............... | B62D 7/1536 |
| | | | | 180/415 |
| 5,330,021 A * | 7/1994 | Beer | ........................ | B62D 1/04 |
| | | | | 180/400 |
| 5,346,030 A * | 9/1994 | Ohmura | ................. | B62D 7/148 |
| | | | | 180/412 |
| 5,402,341 A * | 3/1995 | Liubakka | ............... | B62D 7/159 |
| | | | | 180/412 |
| 6,034,500 A * | 3/2000 | Nagase | ................. | F02D 41/221 |
| | | | | 123/361 |
| 7,323,976 B2 * | 1/2008 | Lu | .......................... | B60T 8/172 |
| | | | | 340/438 |
| 7,438,154 B2 * | 10/2008 | Lim | ........................ | B62D 3/12 |
| | | | | 180/421 |
| 7,676,307 B2 * | 3/2010 | Schmitt | .................. | B60T 8/241 |
| | | | | 701/38 |
| 7,734,406 B1 * | 6/2010 | Oppenheimer | ......... | B60T 8/885 |
| | | | | 701/70 |
| 8,033,376 B2 * | 10/2011 | Toews | .................. | A01D 75/008 |
| | | | | 198/300 |
| 8,302,728 B1 * | 11/2012 | Dotson | ................ | A63H 17/262 |
| | | | | 180/408 |
| 8,321,088 B2 * | 11/2012 | Brown | ................ | B60W 50/035 |
| | | | | 701/38 |
| 8,401,730 B2 * | 3/2013 | Bechtler | ............... | B60T 8/3685 |
| | | | | 701/29.7 |
| 8,467,929 B2 * | 6/2013 | Bechtler | ................ | B60T 8/885 |
| | | | | 701/30.3 |
| 8,738,219 B2 * | 5/2014 | Bechtler | ................ | B60T 8/885 |
| | | | | 701/31.1 |
| 8,754,764 B2 * | 6/2014 | Bechtler | ................ | B60T 8/885 |
| | | | | 340/506 |
| 9,702,349 B2 * | 7/2017 | Anderson | .............. | B60G 13/14 |
| 2002/0082749 A1 * | 6/2002 | Meyers | ................... | B60T 8/243 |
| | | | | 701/1 |
| 2006/0169527 A1 * | 8/2006 | Lim | ........................ | B62D 3/12 |
| | | | | 180/444 |
| 2008/0059034 A1 * | 3/2008 | Lu | ....................... | B60T 8/17552 |
| | | | | 701/71 |
| 2008/0086248 A1 * | 4/2008 | Lu | ........................... | B60T 8/171 |
| | | | | 701/41 |
| 2008/0281489 A1 * | 11/2008 | Le Vourch | ............. | B62D 7/159 |
| | | | | 701/41 |
| 2009/0038876 A1 * | 2/2009 | Ito | .......................... | B62D 5/065 |
| | | | | 180/421 |
| 2014/0012469 A1 * | 1/2014 | Kunihiro | ................ | B62D 6/001 |
| | | | | 701/41 |
| 2016/0016582 A1 * | 1/2016 | Han | ...................... | B62D 5/003 |
| | | | | 701/41 |
| 2016/0052547 A1 * | 2/2016 | Kashiwai | ............ | B60W 40/076 |
| | | | | 701/41 |

FOREIGN PATENT DOCUMENTS

| | | |
|---|---|---|
| JP | 2007-230275 A | 9/2007 |
| JP | 2015-089694 A | 5/2015 |
| KR | 10-1612670 B1 | 4/2016 |
| WO | WO-2010128585 A1 * | 11/2010 ............. B62D 17/00 |

OTHER PUBLICATIONS

Google Translation of EP-0328002-A2.*
Google Translation of WO-2010128585-A1.*
Korean Office Action dated Nov. 1, 2018 issued in Korean Patent Application No. 10-2017-0115897.

* cited by examiner

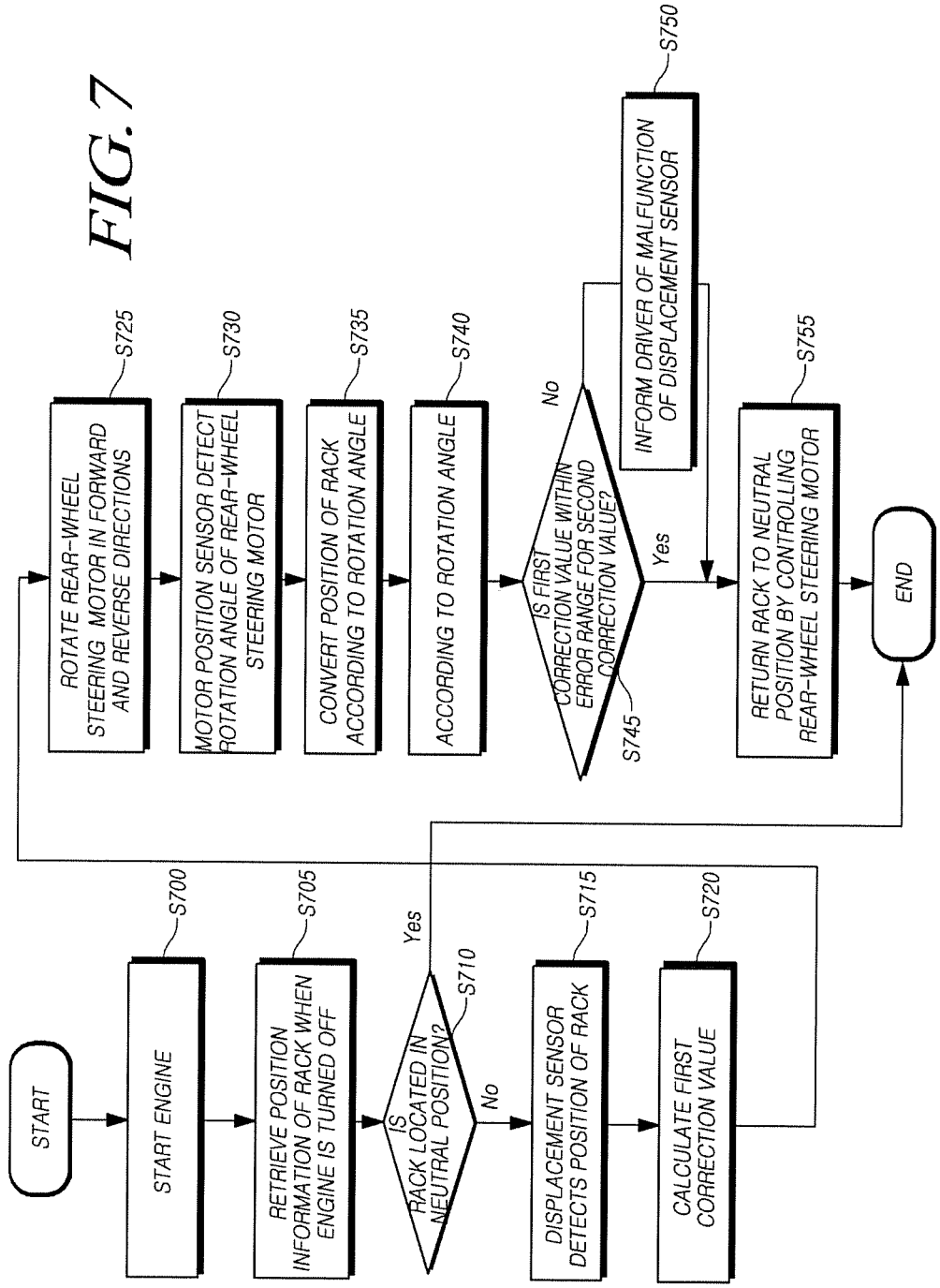

REAR-WHEEL STEERING SYSTEM AND CONTROLLING METHOD THEREOF

CROSS REFERENCE TO RELATED APPLICATION

This application claims priority from Korean Patent Application No. 10-2017-0115897, filed on Sep. 11, 2017, which is hereby incorporated by reference for all purposes as if fully set forth herein.

BACKGROUND OF THE INVENTION

1. Field of the Invention

The present disclosure relates to a rear-wheel steering system and a controlling method thereof, and more particularly, to a rear-wheel steering system and a controlling method thereof which allows a position of a rack to be identified and returns the rack to a neutral position even when an error has occurred in a displacement sensor or there is no displacement sensor.

2. Description of the Related Art

Currently, most vehicles are equipped with a front-wheel steering system that uses front wheels to steer the vehicles. In recent years, with the spread of electric vehicles and hybrid vehicles, the improvement of fuel efficiency has been an important issue, and the development of a rear-wheel steering system (RWS), which solves problems of existing four-wheel steering systems, has been actively conducted in accordance with the demand for the development of a system for improving turning performance of a vehicle during high-speed driving.

The rear-wheel steering system does not have a column or a steering wheel, which is included in the front-wheel steering system, and controls a lead screw and a steering motor by receiving information necessary for rear-wheel steering using an intra-vehicle communication network.

When an engine of a vehicle is turned off, the rear-wheel steering system stops operation of the steering motor for driving a rack and an actuator which steer rear wheels. When the vehicle is turned off, the rack may fail to return to a neutral position and when the engine is started again, the steering motor is driven to return the rack to the neutral position. In the rear-wheel steering system, a displacement sensor is used to determine whether the rack is located in the neutral position.

The displacement sensor detects an absolute value of a displacement of the rack. In the rear-wheel steering system, whether the rack is located in the neutral position is determined using the absolute value. When an error occurs in the displacement sensor, the position of the rack cannot be identified, and thus it is not possible to return the rack to the neutral position. Therefore, there is a need for a method to identify the position of the rack using another device when the displacement sensor is in error. In addition, it is necessary to find a method which allows the position of the rack to be identified without the displacement sensor and thus reduces the production cost by removing the displacement sensor.

SUMMARY OF THE INVENTION

In this background, the present disclosure is to provide a rear-wheel steering system and a controlling method thereof, in which a position of a rack is identified even when a displacement sensor is in error in order to return the rack to a neutral position.

In addition, the present disclosure is to provide a rear-wheel steering system and a controlling method thereof in which a position of a rack is identifiable even when a displacement sensor is absent and thus the production cost is reducible by removing the displacement sensor.

To solve the foregoing problems, an embodiment provides a rear-wheel steering system including: a rack configured to transmit a driving force generated from a rear-wheel steering motor to rear wheels; a first correction module configured to, when an engine is started, detect a position of the rack using a displacement sensor and calculate a first correction value that is a difference between the detected position and a neutral position; a second correction module configured to, when the engine is started, detect a position of the rack using a motor position sensor that detects a rotation angle of the rear-wheel steering motor and calculate a second correction value that is a difference between the detected position and the neutral position; a comparison determiner configured to compare the first correction value and the second correction value to determine whether the displacement sensor has malfunctioned; and a steering controller configured to control an operation of the rear-wheel steering motor.

An embodiment provides a rear-wheel steering system including: a rack configured to transmit a driving force generated from a rear-wheel steering motor to rear wheels; a motor position sensor configured to detect a rotation angle of the rear-wheel steering motor; a steering controller configured to control an operation of the rear-wheel steering motor; a start controller configured to, when an engine is started, transmit a control signal to the steering controller to drive the rear-wheel steering motor sequentially in forward and reverse directions so that the rack sequentially moves from a starting position to both side ends of a rack stroke within the rack stroke; and a second correction value calculator configured to identify a starting position of the rack using the rotation angle of the rear-wheel steering motor detected by the motor position sensor when the rack moves within the rack stroke.

An embodiment provides a controlling method of a rear-wheel steering system, including: detecting an absolute value for a position of a rack which transmits a driving force generated from a rear-wheel steering motor to rear wheels when an engine is started and calculating a first correction value that is a difference between the position of the rack and a neutral position; detecting a position of the rack using a rotation angle of the rear-wheel steering motor and calculating a second correction value that is a difference between the detected position of the rack and the neutral position; and comparing the first correction value and the second correction value to determine whether the displacement sensor has malfunctioned.

According to the present embodiments, a value detected by the displacement sensor is verified using a value detected by the motor position sensor so that whether an error has occurred in the displacement sensor can be determined and the rack can be returned to the neutral position even when an error has occurred in the displacement sensor. In addition, even in the case in which the displacement sensor is removed, it is possible to detect the position of the rack, and thus the production cost can be reduced by removing the displacement sensor.

BRIEF DESCRIPTION OF THE DRAWINGS

The above and other aspects, features and advantages of the present disclosure will be more apparent from the following detailed description taken in conjunction with the accompanying drawings, in which:

FIG. 7 is a flowchart illustrating a process of performing a position correction of the rack in a rear-wheel control system according to the present disclosure.

DETAILED DESCRIPTION OF THE EXEMPLARY EMBODIMENTS

Figure 1:
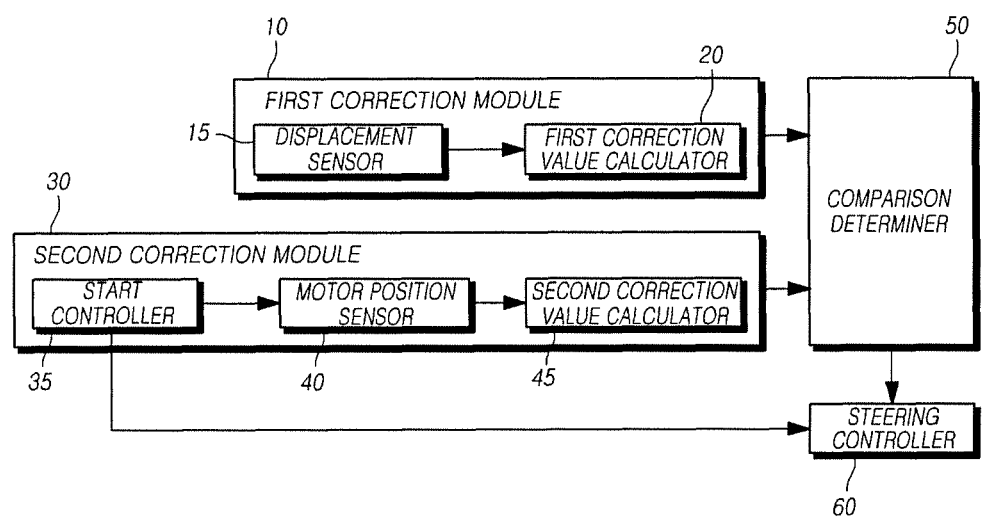
FIG. 1 is a block diagram illustrating a configuration of a rear-wheel steering system according to the present disclosure.

Hereinafter, some embodiments of the present disclosure will be described in detail with reference to the accompanying illustrative drawings. In designating elements of the drawings by reference numerals, the same elements will be designated by the same reference numerals although the elements are shown in different drawings. Further, in the following description of the present disclosure, a detailed description of known functions and configurations incorporated herein will be omitted when it may make the subject matter of the present disclosure unclear.

In addition, terms such as first, second, A, B, (a), (b), and the like may be used herein when describing components of the present disclosure. The terms are merely used to distinguish one component from other components, and the property, order, sequence and the like of the corresponding component are not limited by the corresponding term. When it is described that a certain structural element "is connected to," "is coupled to," or "is in contact with" another structural element, it should be interpreted that still another structural element may be "connected," "coupled," or "in contact" between the structural elements as well as that the certain structural element may be directly connected to or in direct contact with another structural element.

FIG. 1 is a block diagram illustrating a configuration of a rear-wheel steering system according to the present disclosure.

The rear-wheel steering system according to the present disclosure may detect a position of a rack using a motor position sensor 40 of a rear-wheel steering motor even when a displacement sensor 15 is in error or absent, and thus may identify the position of the rack in a rack stroke and return the rack to a neutral position.

To this end, the rear-wheel steering system includes a first correction module 10 configured to determine the position of the rack using the displacement sensor 15 and calculate a first correction value, a second correction module 30 configured to determine the position of the rack using the motor position sensor 40 which detects a rotation angle of the rear-wheel steering motor and calculate a second correction value, a comparison determiner 50 configured to verify the first correction module 10 by comparing the first correction value calculated by the first correction module 10 and the second correction value calculated by the second correction module 30, and a steering controller 60 configured to control an operation of the rear-wheel steering motor for steering rear wheels.

The rear-wheel steering motor steers the rear wheels according to a steering angle determined by the steering controller 60, and one rear-wheel steering motor is provided for a pair of rear wheels. The rear-wheel steering motor may be provided with a control signal generated from a front-wheel steering system through vehicle communication such as Controller Area Network (CAN), Flex, and the like.

Figure 2:
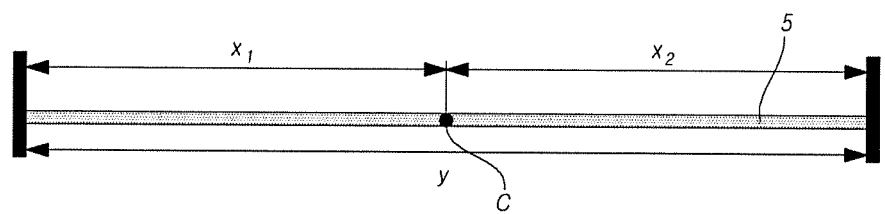
FIG. 2 is a conceptual diagram illustrating a rack stroke when a center of a rack is located in a neutral position.

As the rear-wheel steering motor is driven, the rack may move linearly in a lengthwise direction and transmit a driving force of the rear-wheel steering motor to the rear wheels. The rack stroke may indicate a section or a length by which the rack moves. The rack may have blocking walls disposed at a predetermined interval in the lengthwise direction of the rack 5, as shown in FIG. 2, and the rack may move between the two blocking walls. That is, the rack 5 may move in the lengthwise direction only by the width of the rack stroke.

When a center c of the rack 5 is located in the neutral position, widths $x_1$ and $x_2$ between each of the two blocking walls and the neutral position are the same. For example, when a length y of the rack stroke is set to 20 mm, the neutral position of the rack 5 becomes a position of 10 mm away from each blocking wall, and when the center c of the rack 5 is located in the neutral position, a distance $x_1$ from the center c of the rack 5 to one blocking wall is 10 mm and a distance $x_2$ to the other blocking wall is 10 mm.

The neutral position of the rack 5 may vary depending on the width of the rack stroke. When the rack stroke is set to 30 mm, the neutral position of the rack 5 becomes a position of 15 mm away from each blocking wall and distances from the neutral position to each of the two blocking walls each are 15 mm.

The first correction module 10 may include the displacement sensor 15 and a first correction value calculator 20.

The displacement sensor 15 may be a linear variable differential transformer (LVDT) sensor, a permanent-magnetic linear contactless displacement (PLCD) sensor, or the like. The displacement sensor 15 is installed close to the rack 5 and detects a linear displacement of the rack 5 when the rack 5 moves. The displacement sensor 15 may generate a magnetic field signal or a voltage signal according to the linear movement of the rack 5 and provide the corresponding signal to the first correction value calculator 20.

The first correction value calculator 20 may determine the position of the rack 5 using the signal provided from the displacement sensor 15 and calculate the first correction value, which indicates a difference between a starting position of the rack 5 and the neutral position of the rack stroke, according to the determined position. Here, the starting position indicates a position of the rack when an engine is turned on.

Figure 3:
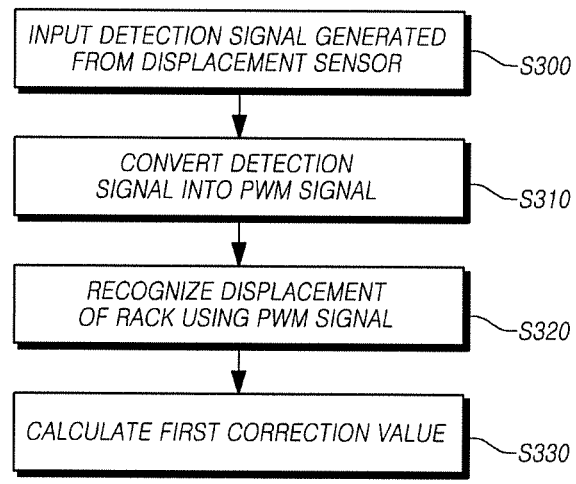
FIG. 3 is a block diagram illustrating a process of calculating a first correction value by a first correction module of FIG. 1.

To this end, as shown in FIG. 3, when a detection signal generated from the displacement sensor 15 is input (S300), the first correction value calculator 20 may convert the detection signal into a pulse width modulation (PWM) signal (S310). The PWM signal linearly increases or decreases according to the linear displacement of the rack 5, as shown in a graph of FIG. 4. Accordingly, the PWM signal and the displacement of the rack 5 correspond in a one-to-one fashion, and thus the first correction value calculator 20 may identify the starting position of the rack 5, which is an absolute value (S320). When the starting position of the rack 5 is identified, the first correction value calculator 20 may determine the first correction value, which is a difference between the neutral position of the rack 5 and the starting position of the rack 5, and a direction in which the starting position deviates from the neutral position (S330). In this case, the first correction value calculator 20 may have information on the length of the rack stroke and the neutral position and accordingly calculate a difference between the neutral position of the rack 5 and the starting position of the rack 5.

Figure 5:
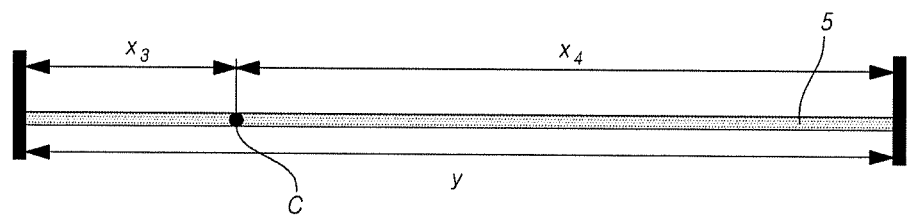
FIG. 5 is a conceptual diagram illustrating a rack stroke when the center of the rack deviates from the neutral position.

For example, as shown in FIG. 5, when a length y of the rack stroke is 20 mm and the starting position of the center c of the rack 5 is 5 mm ($x_3$) away from a right end of the rack stroke and 15 mm ($x_4$) away from a left end thereof, the first correction value calculator 20 may output a value of 5 mm in the left direction as the first correction value.

The first correction value calculator 20 may transmit the calculated first correction value to the comparison determiner 50.

The second correction module 30 may include the motor position sensor 40, a second correction value calculator 45, and a start controller 35.

The motor position sensor 40 is a sensor for detecting a rotation angle of the rear-wheel steering motor in real time and may employ a hall sensor that detects a position of the motor using a characteristic of a hall integrated circuit (IC) in which a voltage is changed according to the intensity of a magnetic field.

The motor position sensor 40 may detect a rotation angle and a rotation direction when the rear-wheel steering motor is driven, and provide information on the detected rotation angle and rotation direction of the rear-wheel steering motor to the second correction value calculator 45.

When the engine is started, the start controller 35 may request the steering controller 60 to drive the rear-wheel steering motor so that the starting position of the rack 5 is identified and the second correction value can be calculated.

Figure 6:
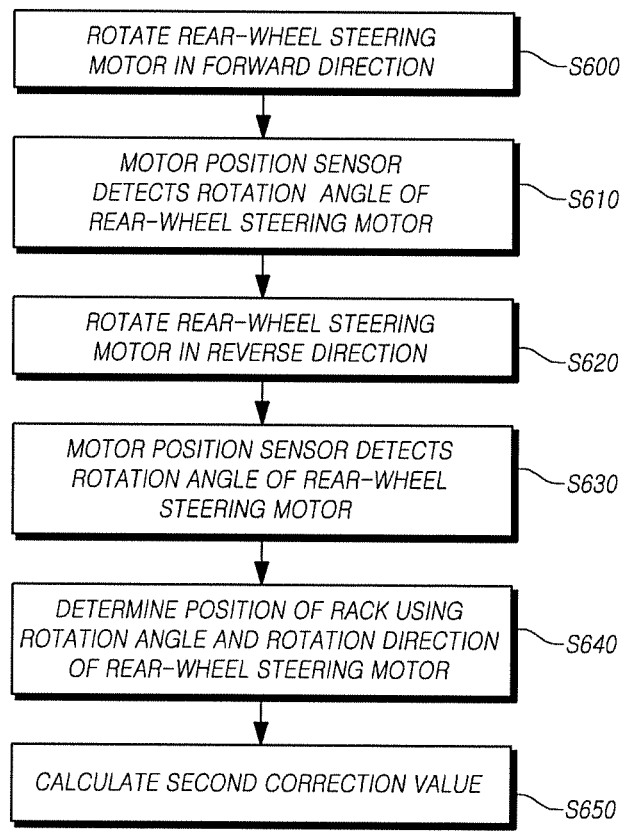
FIG. 6 is a block diagram illustrating a process of calculating a second correction value by a second correction module of FIG. 1.

As shown in FIG. 6, the start controller 35 may transmit a control command to the steering controller 60 to rotate the rear-wheel steering motor in a forward direction such that the center of the rack 5 moves from the starting position to one blocking wall within the rack stroke (S600). Then, the start controller 35 may transmit a control command to the steering controller 60 to rotate the rear-wheel steering motor in a reverse direction such that the center of the rack 5 moves from one blocking wall to the other blocking wall (S630).

While the rear-wheel steering motor is being driven such that the center of the rack 5 moves from the starting position of the rack 5 to one blocking wall and from the one blocking wall to the other blocking wall, the motor position sensor 40 may detect the rotation angle of the rear-wheel steering motor in real time (S610 and S630).

The motor position sensor 40 provides the second correction value calculator 45 with information about the rotation direction and the rotation angle at which the rear-wheel steering motor is rotated when the rack 5 moves from the starting position to one blocking wall and information about the rotation direction and the rotation angle at which the rear-wheel steering motor is rotated when the rack 5 moves from the one blocking wall to the other blocking wall. The second correction value calculator 45 identifies the starting position of the rack using the information about the two rotation angles and two rotation directions detected by the motor position sensor 40 (S640).

The second correction value calculator 45 may determine the position of the center of the rack 5 in the rack stroke using the rotation angle and the rotation direction of the rear-wheel steering motor detected by the motor position sensor 40. As the rack stroke is predetermined, the forward and reverse maximum angles of rotation of the rear-wheel steering motor when the rack 5 moves within the rack stroke are known in advance. For example, when the width of the rack stroke is 20 mm, the forward and reverse maximum angles of rotation of the rear-wheel steering motor from the neutral position each are about 3 degrees. Thus, in a case in which the center of the rack 5 is located in the neutral position within the rack stroke, when the rear-wheel steering motor is rotated in the forward direction and in the reverse direction under the control of the start controller 35, the angle at which the rear-wheel steering motor is rotated in the forward direction has to be the same as the angle at which the rear-wheel steering motor is rotated in the reverse direction.

On the other hand, when the center of the rack 5 deviates from the neutral position, for example, when the width of the rack stroke is 20 mm and the rack 5 moves 5 mm toward the right side blocking wall as shown in FIG. 5, a distance from the center of the rack 5 to the left side blocking wall is 15 mm and a distance from the center of the rack 5 to the right side blocking wall is 5 mm.

In this state, the steering controller 60 controls the rear-wheel steering motor in the forward direction and in the reverse direction such that the engine is started and the center of the rack 5 moves from the starting position to the right side blocking wall and then moves back from the right side blocking wall to the left side blocking wall. Then, the motor position sensor 40 may detect the directions and angles of rotation of the rear-wheel steering motor in the forward direction and in the reverse direction and transmit the detected rotation directions and angles to the second correction value calculator 45.

For example, when the forward and reverse maximum angles of rotation of the rear-wheel steering motor each are about 3 degrees, a direction of rotation toward the right side blocking wall is referred to as a forward direction, and a direction of rotation from the right side blocking wall toward the left side blocking wall is referred to as a reverse direction, the rear-wheel steering motor is rotated by 1.5 degrees in the forward direction because a distance to the right side blocking wall is 5 mm, and the rear-wheel steering motor is rotated by 6 degrees in the reverse direction because a distance from the right side blocking wall to the left side blocking wall is 20 mm.

When the center of the rack 5 is located in the neutral position of the rack stroke, the rear-wheel steering motor has to rotate by 3 degrees, but actually, the rear-wheel steering motor rotates by 1.5 degrees. Accordingly, the second correction value calculator 45 may determine that the center of the rack 5 can return to the neutral position of the rack stroke only when the rack 5 is rotated by 1.5 degrees in the reverse direction from the starting position. When the information about the rotation angle and rotation direction is obtained, the second correction value calculator 45 may convert the information about the rotation angle and rotation direction into lengths. Since the total length of the rack stroke is 20 mm and the rear-wheel steering motor rotates by 3 degrees in each of the forward and reverse directions, an angle of 1.5 degrees corresponds to 5 mm. In this case, the rear-wheel steering motor has to be rotated in the reverse direction, and thus the second correction value calculator 45 may output a value of 5 mm toward the left side blocking wall as the second correction value (S650).

The second correction value calculator 45 may transmit information on the second correction value for returning the rack 5 to the neutral position to the comparison determiner 50.

When the comparison determiner 50 has received information on the first correction value calculated by the first correction value calculator 20 of the first correction module 10 and the information on the second correction value calculated by the second correction value calculator 45 of the second correction module 30, the comparison determiner 50 may compare the first correction value and the second correction value. When the comparison result indicates that the first correction value falls within a preset specific error range for the second correction value, the comparison determiner 50 determines that the displacement sensor 15 of the first correction module 10 operates normally, and causes the steering controller 60 to control the rear-wheel steering motor such that the center of the rack 5 can return to the neutral position.

When the first correction value does not fall within the preset error range, the comparison determiner 50 may determine that an error has occurred in the displacement sensor 15, and display the error of the displacement sensor 15 in an external display device so that a driver can recognize the error. At the same time, the comparison determiner 50 transmits a control signal to the steering controller 60 to control the rear-wheel steering motor such that the center of the rack 5 can return to the neutral position.

When the ignition of a vehicle is turned on or off, the steering controller 60 controls the rear-wheel steering motor to return the center of the rack 5 to the neutral position. When the ignition of the vehicle is turned off, the steering controller 60 may operate the first correction module 10 or the second correction module to control an operation of the rear-wheel steering motor such that the center of the rack 5 returns to the neutral position. Then, the steering controller 60 may recognize the position of the rack 5 using the displacement sensor 15 or the motor position sensor 40 and store information on the recognized position of the rack 5 in a separate memory.

When the ignition of the vehicle is turned off, the position of the rack 5 is controlled to be in the neutral position. However, when an external force is exerted on the rear wheels of the vehicle or steering of the rear wheels is not controlled normally after the ignition of the vehicle is turned off, the rack 5 may deviate from the neutral position.

Accordingly, when the ignition is turned on, the steering controller 60 may output information on the position of the rack 5 stored in the memory and determine whether the rack 5 is located in the neutral position. When the rack 5 is not located in the neutral position, the steering controller 60 may operate the first correction module 10 and the second correction module 30 to identify the starting position of the rack 5.

A process of returning the rack 5 to the neutral position when an engine is started in the rear-wheel steering system with the above-described configuration will be described below with reference to FIG. 7.

When an engine is started (S700), the steering controller 60 retrieves, from the memory, the position information of the rack 5 stored when the ignition of engine is turned off (S705). When the retrieved position of the rack 5 deviates from the neutral position (No in S710), the steering controller 60 may operate the first correction module 10 and the second correction module 30 sequentially or concurrently. Although FIG. 7 illustrates an embodiment in which the first correction module 10 and the second correction module 30 are sequentially operated, it is apparent that the first correction module 10 and the second correction module 30 can be operated concurrently.

However, it is preferable to operate the rear-wheel steering motor such that the motor position sensor 40 can detect the rotation angle and the rotation direction of the rear-wheel steering motor after the displacement sensor 15 of the first correction module 10 detects the displacement of the rack 5.

Figure 4:
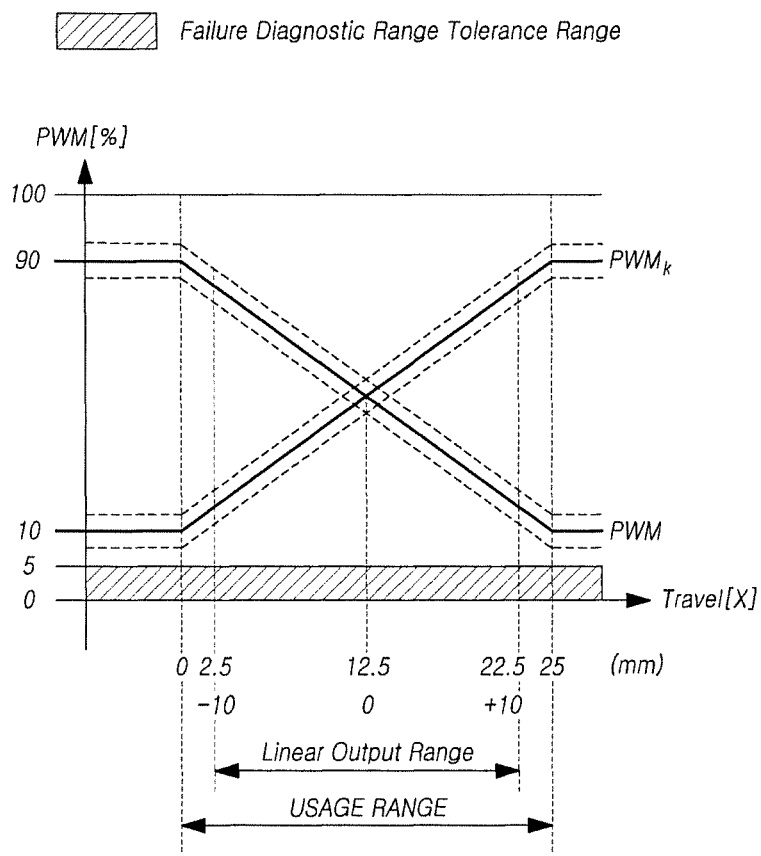
FIG. 4 is a graph showing a relationship between a pulse width modulation (PWM) signal and a position of the rack in the rack stroke.

The displacement sensor 15 of the first correction module 10 detects the displacement of the rack 5 and provides a detection signal to the first correction value calculator 20 (S715), and the first correction value calculator 20 converts the detection signal into a PWM signal and then identifies the starting position of the rack 5 using the graph shown in FIG. 4. The first correction value calculator 20 calculates a difference between the starting position of the rack 5 and the neutral position and outputs the difference as a first correction value (S720). The first correction value calculator 20 may provide the calculated first correction value to the comparison determiner 50.

When the first correction module 10 outputs the first correction value, the start controller 35 of the second correction module 30 requests forward and reverse rotations of the rear-wheel steering motor from the steering controller 60 (S725).

First, the start controller 35 may transmit a command signal to the steering controller 60 to drive the rear-wheel steering motor in the forward direction. When the steering controller 60 drives the rear-wheel steering motor in the forward direction, the rack 5 moves within the rack stroke until the center of the rack 5 reaches one blocking wall. Then, the start controller 35 may transmit a command signal to the steering controller 60 to drive the rear-wheel steering motor in the reverse direction. When the steering controller 60 drives the rear-wheel steering motor in the reverse direction, the rack 5 moves within the rack stroke until the center of the rack 5 reaches the other blocking wall.

When the rack 5 stops moving, the motor position sensor 40 may transmit information on an angle of rotation of the rear-wheel steering motor in the forward direction and information on an angle of rotation of the rear-wheel steering motor in the reverse direction to the second correction value calculator 45 (S730).

The second correction value calculator 45 may identify the starting position of the rack 5 by matching the information on the angles of forward and reverse rotations of the rear-wheel steering motor and the length of the rack stroke (S735) and output a second correction value by comparing the starting position and the neutral position of the rack stroke (S740). The second correction value calculator 45 may provide the calculated second correction value to the comparison determiner 50.

The comparison determiner 50 may compare the first correction value and the second correction value to determine whether the first correction value falls within a preset error range for the second correction value (S745), and when the first correction value is within the preset error range, may determine that the displacement sensor 15 operates normally.

On the other hand, when the first correction value does not fall within the error range for the second correction value, the comparison determiner 50 may determine that an error has occurred in the displacement sensor 15 and inform the driver that the error has occurred (S750).

Meanwhile, in order for the second correction module to calculate the second correction value, the rear-wheel steering motor is rotated in the forward direction so that the rack 5 moves to one blocking wall within the rack stroke, and the rear-wheel steering motor is rotated in the reverse direction so that the rack 5 moves to the other blocking wall within the rack stroke, and accordingly, the center of the rack 5 is located in the other blocking wall of the rack stroke. Thus, when the rack 5 is moved by half of the entire length of the rack stroke, the rack 5 is brought back to the neutral position.

Accordingly, when the steering controller 60 rotates the rear-wheel steering motor in the forward direction by half of the rotation angle of the rear-wheel steering motor detected when the rack 5 is moved from one blocking wall of the rack stroke to the other blocking wall, the rack 5 can be brought back to the neutral position in the rack stroke. Thus, the steering controller 60 may return the center of the rack 5 to the neutral position by driving the rear-wheel steering motor in the forward direction by a returning angle which is equivalent to half of the rotation angle of the rack stroke (S755).

As described above, the rear-wheel steering system according to the present disclosure may identify the starting position of the rack 5 using each of the existing displacement sensor 15 and motor position sensor 40, thereby determining whether the displacement sensor 15 has malfunctioned. In addition, when it is determined that the displacement sensor 15 has operated erroneously, the starting position of the rack 5 may be determined using the motor position sensor 40. Hence, a value detected by the displacement sensor 15 is verified using a value detected by the motor position sensor 40 so that it is possible to determine whether an error has occurred in the displacement sensor 15, and even when the error has occurred in the displacement sensor 15, it is possible to return the rack 5 to the neutral position.

Although an example in which the displacement sensor is provided is described in the above embodiments, in the case in which the displacement sensor is not provided, the position of rack 5 may be identified using only the motor position sensor 40 and the center of the rack 5 may be returned to the neutral position. That is, the rack 5 can be returned to the neutral position even when there is no displacement sensor 15, and hence the displacement sensor may be removed to reduce the production cost.

The standard details or standard documents mentioned in the above embodiments are omitted for the simplicity of the description of the specification, and constitute a part of the present specification. Therefore, when a part of the contents of the standard details and the standard documents is added to the present specification or is disclosed in the claims, it should be construed as falling within the scope of the present disclosure.

The above embodiments of the present disclosure have been described only for illustrative purposes, and those skilled in the art will appreciate that various modifications and changes may be made thereto without departing from the scope and spirit of the disclosure. Therefore, the embodiments of the present disclosure are not intended to limit, but are intended to illustrate the technical idea of the present disclosure, and the scope of the technical idea of the present disclosure is not limited by the embodiments. The scope of the present disclosure shall be construed on the basis of the accompanying claims in such a manner that all of the technical ideas included within the scope equivalent to the claims belong to the present disclosure.

REFERENCE NUMERALS

5: RACK
10: FIRST CORRECTION MODULE
15: DISPLACEMENT SENSOR
20: FIRST CORRECTION VALUE CALCULATOR
30: SECOND CORRECTION MODULE
35: START CONTROLLER
40: MOTOR POSITION SENSOR
45: SECOND CORRECTION VALUE CALCULATOR
50: COMPARISON DETERMINER
60: STEERING CONTROLLER

What is claimed is:

1. A rear-wheel steering system comprising:
   a rack configured to transmit a driving force generated from a rear-wheel steering motor to rear wheels;
   a first correction module configured to, when an engine is started, detect a first position of the rack using a displacement sensor and calculate a first correction value that is a difference between the first position and a neutral position;
   a second correction module configured to, when the engine is started, detect a second position of the rack using a motor position sensor that detects a rotation angle of the rear-wheel steering motor and calculate a second correction value that is a difference between the second position and the neutral position;
   a comparison determiner configured to compare the first correction value and the second correction value to determine whether the displacement sensor has malfunctioned; and
   a steering controller configured to control an operation of the rear-wheel steering motor,
   wherein, when the first correction value is out of a preset error range for the second correction value, the comparison determiner determines that the displacement sensor has malfunctioned and displays a malfunction of the displacement sensor to a driver.

2. The rear-wheel steering system of claim 1, wherein the second correction module includes:
   a start controller configured to transmit a control signal to the steering controller to drive the rear-wheel steering motor sequentially in forward and reverse directions so that the rack sequentially moves from a starting position to both side ends of a rack stroke within the rack stroke; and
   a second correction value calculator configured to identify the starting position of the rack using the rotation angle and a rotation direction of the rear-wheel steering motor detected by the motor position sensor when the rack moves within the rack stroke.

3. The rear-wheel steering system of claim 2, wherein the second correction value calculator has pre-stored information about a relationship between the rotation angle of the rear-wheel steering motor and a length of the rack stroke, and
   wherein the second correction value identifies the starting position of the rack by applying the rotation angle and the rotation direction of the rear-wheel steering motor detected by the motor position sensor to the length of the rack stroke.

4. The rear-wheel steering system of claim 2, wherein, when the comparison determiner completes a determination on the displacement sensor, the steering controller returns the rack to the neutral position by controlling the operation of the rear-wheel steering motor such that the rack moves by half of a length of the rack stroke.

5. The rear-wheel steering system of claim 1, wherein, when the engine is turned off, the steering controller controls the rack to return to the neutral position by operating the rear-wheel steering motor and stores information about a current position of the rack in a memory when the control is completed, and
wherein, when the engine is turned on, the steering controller checks the information about the position of the rack at the time of turning off the engine and operates the first correction module and the second correction module when the rack is not located in the neutral position.

6. A rear-wheel steering system comprising:
a rack configured to transmit a driving force generated from a rear-wheel steering motor to rear wheels;
a motor position sensor configured to detect a rotation angle of the rear-wheel steering motor;
a steering controller configured to control an operation of the rear-wheel steering motor;
a start controller configured to, when an engine is started, transmit a control signal to the steering controller to drive the rear-wheel steering motor sequentially in forward and reverse directions so that the rack sequentially moves from a starting position to both side ends of a rack stroke within the rack stroke; and
a correction value calculator configured to identify a starting position of the rack using the rotation angle of the rear-wheel steering motor detected by the motor position sensor when the rack moves within the rack stroke,
wherein, when the first correction value is out of a preset error range for the second correction value, the comparison determiner determines that the displacement sensor has malfunctioned and displays a malfunction of the displacement sensor to a driver.

7. A controlling method of a rear-wheel steering system, comprising:
detecting an absolute value for a position of a rack which transmits a driving force generated from a rear-wheel steering motor to rear wheels when an engine is started and calculating a first correction value that is a difference between the position of the rack and a neutral position;
detecting a position of the rack using a rotation angle of the rear-wheel steering motor and calculating a second correction value that is a difference between the detected position of the rack and the neutral position; and
comparing the first correction value and the second correction value to verify accuracy of the first correction value,
wherein the comparing the first correction value and the second correction value includes:
determining that a displacement sensor which detects the absolute value of the position of the rack has malfunctioned when the first correction value is out of a preset error range for the second correction value, and
displaying a malfunction of the displacement sensor to a driver.

8. The controlling method of claim 7, wherein the calculating a second correction value includes:
controlling the rack to sequentially move from a starting position of the rack to both side ends of a rack stroke within the rack stroke by sequentially driving the rear-wheel steering motor in forward and reverse directions; and
identifying the starting position of the rack using the rotation angle of the rear-wheel steering motor detected by a motor position sensor when the rack moves within the rack stroke.

9. The controlling method of claim 8, wherein the identifying the start position includes:
identifying the starting position of the rack using information about a length of the rack stroke that matches an already possessed rotation angle of the rear-wheel steering motor, and
applying the rotation angle and a rotation direction of the rear-wheel steering motor, which are detected by the motor position sensor, to the length of the rack stroke.

10. The controlling method of claim 8, further comprising, after the comparing, returning the rack to the neutral position by controlling an operation of the rear-wheel steering motor such that the rack moves by half of a length of the rack stroke.

11. The controlling method of claim 8, further comprising:
controlling the rack to return to the neutral position by operating the rear-wheel steering motor when the engine is turned off; and
when the control is completed, storing information about a current position of the rack in a memory,
wherein, when the rack is not located in the neutral position when the engine is started, the calculating a first correction value and the calculating a second correction value are performed.

* * * * *